(12) United States Patent
Christner et al.

(10) Patent No.: US 8,978,362 B2
(45) Date of Patent: Mar. 17, 2015

(54) METHOD FOR OPERATING AN EXHAUST GAS TREATMENT SYSTEM HAVING AN SCR CATALYTIC CONVERTER

(75) Inventors: Bernd Christner, Huelben (DE); Markus Paule, Korb (DE)

(73) Assignee: Daimler AG, Stuttgart (DE)

( * ) Notice: Subject to any disclaimer, the term of this patent is extended or adjusted under 35 U.S.C. 154(b) by 977 days.

(21) Appl. No.: 12/992,800

(22) PCT Filed: Jul. 22, 2009

(86) PCT No.: PCT/EP2009/005304
§ 371 (c)(1),
(2), (4) Date: Feb. 2, 2011

(87) PCT Pub. No.: WO2010/015326
PCT Pub. Date: Feb. 11, 2010

(65) Prior Publication Data
US 2011/0113753 A1    May 19, 2011

(30) Foreign Application Priority Data
Aug. 7, 2008 (DE) .................. 10 2008 036 885

(51) Int. Cl.
*F01N 3/00* (2006.01)
*F02B 27/04* (2006.01)
(Continued)

(52) U.S. Cl.
CPC .......... *F01N 3/208* (2013.01); *B01D 53/9409* (2013.01); *B01D 53/9477* (2013.01); *B01D 53/9495* (2013.01); *B01D 2251/2067* (2013.01); *B01D 2255/20723* (2013.01); *B01D 2255/20776* (2013.01); *B01D 2255/50* (2013.01); *B01D 2258/012* (2013.01); *F01N 9/00* (2013.01);
(Continued)

(58) Field of Classification Search
CPC ........................... F01N 3/208; B01D 53/9495
USPC ................................... 60/272–324
See application file for complete search history.

(56) References Cited

U.S. PATENT DOCUMENTS 6,004,524 A    12/1999   Morsbach et al.
6,427,439 B1   8/2002    Xu et al.
(Continued)

FOREIGN PATENT DOCUMENTS

DE    103 47 132 A1    6/2004
DE    10 2006 041 6    3/2008
(Continued)

OTHER PUBLICATIONS

PCT Search Report with partial translation of relevant portion dated Nov. 24, 2009 (fifteen (15) pages).
(Continued)

*Primary Examiner* — Thomas Denion
*Assistant Examiner* — Anthony Ayala Delgado
(74) *Attorney, Agent, or Firm* — Crowell & Moring LLP

(57) ABSTRACT

A method for operating an exhaust gas treatment system that includes an SCR catalytic converter is provided. Either a model-based filling level regulation for achieving the target filling level or a model-based efficiency control for achieving the target efficiency is performed according to presettable values for certain operating variables such as a temperature of the exhaust gas or of the SCR catalytic converter.

10 Claims, 5 Drawing Sheets

Figure 1:
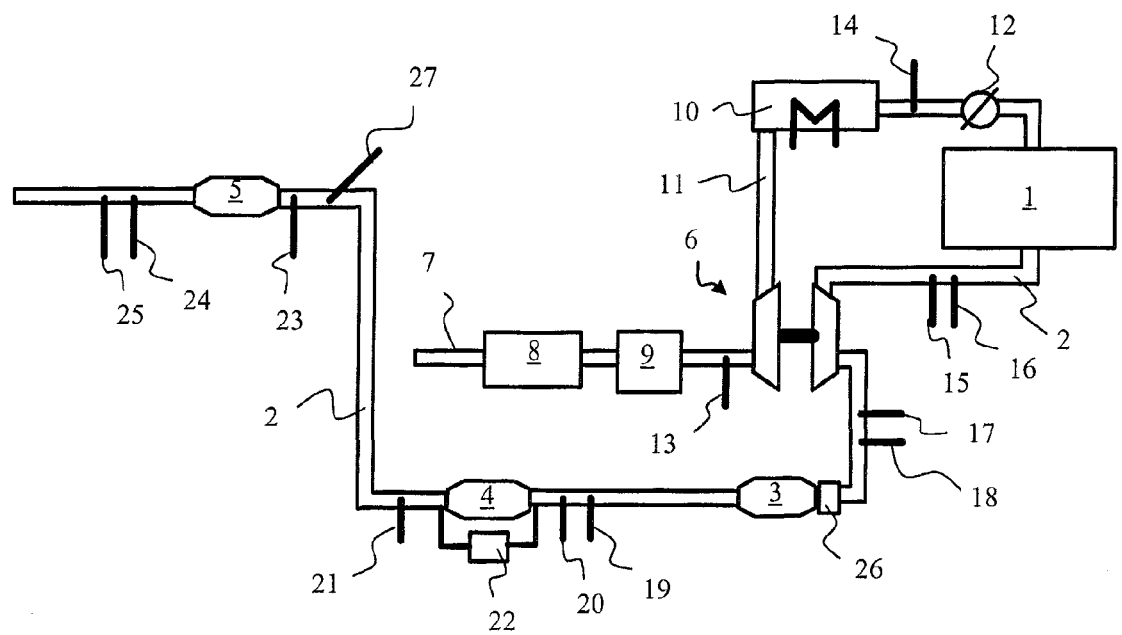

(51) Int. Cl.
  *F01N 3/10*   (2006.01)
  *F01N 3/20*   (2006.01)
  *B01D 53/94*  (2006.01)
  *F01N 9/00*   (2006.01)

(52) U.S. Cl.
  CPC ..... *F01N 2560/021* (2013.01); *F01N 2560/026* (2013.01); *F01N 2570/14* (2013.01); *F01N 2900/0404* (2013.01); *F01N 2900/1622* (2013.01); *Y02T 10/47* (2013.01); *Y02T 10/24* (2013.01)
  USPC ............... 60/286; 60/287; 60/295; 60/299; 60/301; 60/273

(56)       References Cited

U.S. PATENT DOCUMENTS

| | | | |
|---|---|---|---|
| 8,486,341 B2* | 7/2013 | Driscoll et al. | 422/177 |
| 2004/0098974 A1 | 5/2004 | Nieuwstadt et al. | |
| 2009/0000279 A1 | 1/2009 | Ichikawa et al. | |
| 2009/0000280 A1 | 1/2009 | Ichikawa et al. | |
| 2009/0084086 A1 | 4/2009 | Samuelsen | |
| 2009/0272099 A1* | 11/2009 | Garimella et al. | 60/277 |
| 2010/0050614 A1* | 3/2010 | Parmentier et al. | 60/287 |
| 2010/0058740 A1* | 3/2010 | Kurtz | 60/286 |

FOREIGN PATENT DOCUMENTS

| | | |
|---|---|---|
| DE | 10 2007 016 4 | 10/2008 |
| DE | 10 2008 002 3 | 1/2009 |
| EP | 0 554 766 A1 | 8/1993 |
| EP | 1 348 477 A1 | 10/2003 |

OTHER PUBLICATIONS

Clean Diesel Technologies Introducing Urea-Dosing Units for SCR into Europe, Green Car Congress, Feb. 16, 2006, obtained from the internet (www.greencarcongress.com/2006/02/clean_diesel_te.html) on Mar. 4, 2014.

* cited by examiner

METHOD FOR OPERATING AN EXHAUST GAS TREATMENT SYSTEM HAVING AN SCR CATALYTIC CONVERTER

CROSS-REFERENCE TO RELATED APPLICATIONS

The present application is a national stage application of PCT International Application No. PCT/EP2009/005304, filed Jul. 22, 2009, and claims priority under 35 U.S.C. §119 to German Patent Application No. 10 2008 036 885.7, filed Aug. 7, 2008, the entire disclosures of these documents are herein expressly incorporated by reference.

BACKGROUND AND SUMMARY OF THE INVENTION

The present invention relates to a method for operating an exhaust gas treatment system, comprising an SCR catalytic converter for cleaning an exhaust gas of a motor vehicle internal combustion engine, wherein an ammonia-containing reducing agent is dosed to the exhaust gas and an exhaust enriched with $NH_3$ according to the dosing is fed to the SCR catalytic converter, wherein an ammonia filling level value for a filling level of ammonia stored in the SCR catalytic converter is calculated by a computer model.

For the catalytically supported removal of nitrogen oxides (NOx) from internal combustion engine exhaust gases, it is known to add aqueous urea solution as a reducing agent containing ammonia ($NH_3$) to the exhaust gas. In the hot exhaust gas, $NH_3$ is released as the actual selective reducing agent with regard to the NOx reduction at a so-called SCR catalytic converter by means of thermolysis and/or hydrolysis. Thus, one problem is determining an appropriate feed rate for the reducing agent while avoiding an overdosing from an undesired slip of $NH_3$.

For solving these problems, EP 1 348 477 A1 discloses determining a usage rate of $NH_3$ stored in the catalytic converter and a NOx cleaning rate and to control the reducing agent feed in dependence on these variables in connection with a filling level of $NH_3$ stored in the catalytic converter.

Published application EP 0 554 766 A1 discloses a method for the NOx reduction in exhaust gases by controlled hyperstoichiometric addition of $NH_3$, wherein $NH_3$ is dosed upstream of a catalytic converter until the $NH_3$ amount stored in the catalytic converter has reached an upper threshold value. The $NH_3$ stored in the catalytic converter is used with the NOx emitted by the internal combustion engine and fed to the catalytic converter, whereby the toxic substance NOx is removed from the exhaust gas. The $NH_3$ feed is again carried on when the $NH_3$ amount stored in the catalytic converter has reached a lower threshold.

In these and other known similar methods, a model-based combination of measurement values and stored characteristic values often takes place, for example for the SCR catalytic converter. A $NH_3$ feed rate and a modeled usage rate are balanced by an integration continuously carried out and the reducing agent dosing rate is chosen in such a manner that a $NH_3$ filling level that is aimed for results in a desired catalytic converter efficiency. It has, however, been shown that errors caused by, for example, parameter changes add up in the course of time, so that the correspondence between the modeled $NH_3$ filling level of the catalytic converter and the actual value worsens and dosing errors result in the form of an underdosing or overdosing. The result of this is a reduced cleaning effect or an increased $NH_3$ slip.

Exemplary embodiments of the present invention provide a method for operating an exhaust gas cleaning system with an SCR catalytic converter, which provides an improved nitrogen oxide conversion.

An exemplary method for operating an exhaust gas treatment system, comprising an SCR catalytic converter for cleaning an exhaust gas of a motor vehicle internal combustion engine is provided. The method involves adding, by a dosing unit controllable by a control unit, an ammonia-containing reducing agent to the exhaust gas at an adjustable dosing rate; feeding an exhaust gas enriched with ammonia according to the dosing is to the SCR catalytic converter; determining, using a computer model, an ammonia filling level value for a filling state of ammonia stored in the SCR catalytic converter; determining, using the computer model, a model dosing rate for the dosing of the reducing agent into the exhaust gas, at which a target filling level of ammonia stored in the SCR catalytic converter specified by the computer model or a target efficiency specified by the computer model for a nitrogen oxide conversion with ammonia stored in the SCR catalytic converter or fed to the SCR catalytic converter must be at least approximately achieved; performing either a model-based filling level regulation for achieving the target filling level or a model-based efficiency control for achieving the target efficiency, wherein, with an active filling state regulation and when presettable values are exceeded, an efficiency control is switched to when exceeding presettable values for
 a current filling capacity determined by the computer model for an ammonia amount that can maximally currently be stored in the SCR catalytic converter,
 a temperature of the exhaust gas or of the SCR catalytic converter,
 a mass flow of exhaust gas flowing into the SCR catalytic converter, or
 a mass flow of nitrogen oxide flowing into the SCR catalytic converter,
wherein a base efficiency is determined by the computer model that at least approximately corresponds to a currently possible maximum efficiency for the NOx conversion of the SCR catalytic converter and a presettable fraction of the base efficiency is given as the target efficiency with an active efficiency control.

With the method according to the invention, a $NH_3$ filling level value for a filling level of ammonia stored in the SCR catalytic converter is calculated. A model dosing rate for the dosing of the reducing agent into the exhaust gas is calculated by the computer model, with which a target filling level of NH3 stored in the SCR catalytic converter presettable by the computer model or a presettable target efficiency for a NOx conversion with $NH_3$ stored in the SCR catalytic converter and/or fed to the catalytic converter shall be reached at least approximately. A dosing unit is thereby accessed for the emission of the reducing agent with a corresponding dosing rate.

It is provided according to the invention to perform either a model-based filling level regulation for reaching the target filling level or a model-based efficiency for reaching the target efficiency. A switch-over from the filling level regulation to the efficiency control and vice versa is carried out depending on presettable values for a current filling capacity determined by the computer model for an ammonia amount that can maximally currently be stored in the SCR catalytic converter and/or for a temperature of the exhaust gas or of the SCR catalytic converter, and/or for a mass flow of exhaust gas flowing into the SCR catalytic converter, and/or for a mass flow of nitrogen oxide flowing into the SCR catalytic converter. The filling level of $NH_3$ stored in the SCR catalytic converter is important for the NOx conversion of the SCR catalytic converter in wide operating regions. Using the model-based filling level regulation, a high efficiency for the NOx conversion of the SCR catalytic converter can be reached at least approximately in wide operating regions. The use of a computer model thereby allows for the fact that the $NH_3$ filling level of the SCR catalytic converter is not accessible for a direct measurement or only in an inexact manner with considerable effort. A model-based filling level regulation is thereby meant to be a regulation method where a $NH_3$ filling level of the SCR catalytic converter determined by the computer model is regulated as a regulation variable with a return to the target filling level which is also presettable by the computer model. An efficiency of the NOx conversion is meant to be a relative NOx conversion which results as a quotient of an NOx amount converted to non-toxic components during a time interval and an NOx amount flowing into the SCR catalytic converter in the same time interval.

It has, however, been shown that it is difficult to realize an NOx conversion free from $NH_3$ slip with the desired exactness or to the desired extent using the of the model-based filling level regulation. This problem is faced by the switch to the model-based efficiency control for reaching the target efficiency provided according to the invention. A model-based efficiency control is thereby meant to be a control of the efficiency for the NOx conversion of the SCR catalytic converter, wherein the target efficiency to be reached is adjusted at least approximately by the computer model while foregoing the return of a determined actual efficiency in a controlled manner.

Presettable values for the current $NH_3$ filling capacity of the SCR catalytic converter thereby serve as switch-over criteria from the filling level regulation to the efficiency control, and/or for a temperature of the exhaust gas or of the SCR catalytic converter, and/or for a mass flow of exhaust gas flowing into the SCR catalytic converter, and/or for a mass flow of nitrogen oxide flowing into the SCR catalytic converter. The respective variables can be determined indirectly from operating data of the internal combustion engine using the computer model or by a direct measurement. Using the switch-over between the filling level regulation and the efficiency control provided according to the invention, altogether a high NOx conversion free of $NH_3$ slip is altogether achieved in an advantageous manner in very wide operating region limits and thereby altogether a very low NOx emission.

In one arrangement of the invention, a base efficiency is determined by the computer model, which base efficiency corresponds at least approximately to a currently possible maximum efficiency for the NOx conversion of the SCR catalytic converter and has a presettable fraction of the base efficiency given as target efficiency with an active efficiency control. With an active efficiency control, control is to a target efficiency that is only slightly below the maximum possible efficiency. A control to a target efficiency of about 95% to 70% of the maximum possible efficiency determined by the computer model. In this manner, a sufficiently high NOx can be achieved on the one hand even while foregoing a regulation, on the other hand, an $NH_3$ slip, which can result with a higher efficiency, can be avoided with a high safety.

In a further arrangement of the invention, a pre-control of the dosing rate is carried out with an active filling level regulation and/or with an active efficiency control. A value for the dosing rate of the reducing agent is determined from the computer model, with which the target filling level or the target efficiency should result corresponding to the deposited model. This value serves as a pre-control value, with which the dosing unit is controlled. In the case of the active filling level regulation, resulting deviations thus only have to be regulated. Thus, the reference action of the control loop is improved. In the case of the active efficiency control, the NOx content in the exhaust gas can be sensed on the output side of the SCR catalytic converter using an NOx sensor and it is compared by the computer model if the measured NOx content at least approximately coincides with the NOx content resulting from the target efficiency. In the case of a deviation that is not tolerated, the adjusted dosing rate is changed correspondingly.

In a further arrangement of the invention, a correction to a target dosing rate by a changeable long term adaption factor is provided for the model dosing rate with the active filling level regulation and/or with an active efficiency control and in a further arrangement of the invention, a correction to an assumed actual filling level is provided by a changeable short term adaption factor by an active filling level regulation for the ammonia filling level value. Thus, the possibility is provided according to the invention to perform a correction acting directly on the model dosing rate, which will become immediately effective on the one hand, but is possibly however maintained over a longer time on the other hand. On the other hand, the possibility is provided to perform a correction of the modeled $NH_3$ filling level acting in the short term. In this manner, disturbing influences occurring in the short term and disturbing influences effective over a longer time, for example gradually progressing ageing or drift effects, can be compensated for.

In a further arrangement of the invention, nitrogen oxide emission values and/or ammonia emission values of the exhaust gas are continuously determined, and the nitrogen oxide and/or ammonia emission values are evaluated cyclically with regard to fulfilling the presettable short term adaption criterion and/or a long term adaption criterion. The nitrogen oxide and/or ammonia emission values of the exhaust gas are preferably determined by values sensed in a measurement-technical manner using a suitable exhaust gas sensor. The emission values can, however, also be taken from operating characteristic fields. In this manner, a direct control of the filling state regulation or of the efficiency control is enabled with regard to a correct operation. A modeled $NH_3$ filling level value, possibly corrected subsequent to a cycle to the assumed actual filling level, then serves as the current filling level value, on which a further balancing integration and dosing sits in order to achieve the target filling level or the target efficiency. This is synonymous with a short term adaption of the $Nh_3$ filling level value, with which is reacted promptly to short term influences, which possibly lead to a false modeling of the $NH_3$ filling level. However, a correction of the model dosing rate, possibly performed by multiplication with the long term adaption factor, has an effect beyond a cycle, which is synonymous with a long term adaption. By the procedure according to the invention with a cyclically performed check of modeled operating variables, a cyclic adaptation of these operating variables is enabled if this is necessary.

Advantageous embodiments of the invention are illustrated in the drawings and are described in the following. The previously mentioned characteristics and which will still be explained in the following cannot only be used in the respectively given combination but also in other combinations or on their own without leaving the scope of the present invention.

BRIEF DESCRIPTION OF THE DRAWING FIGURES

Figure 2:
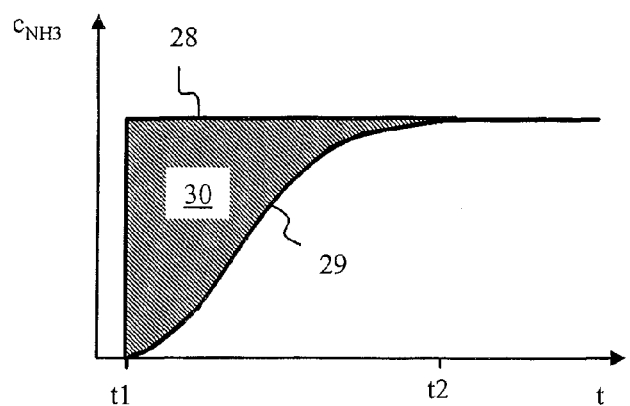
Figure 3:
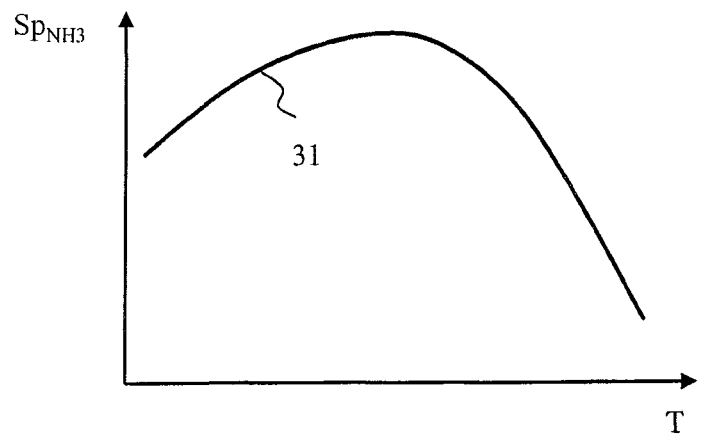
Figure 4:
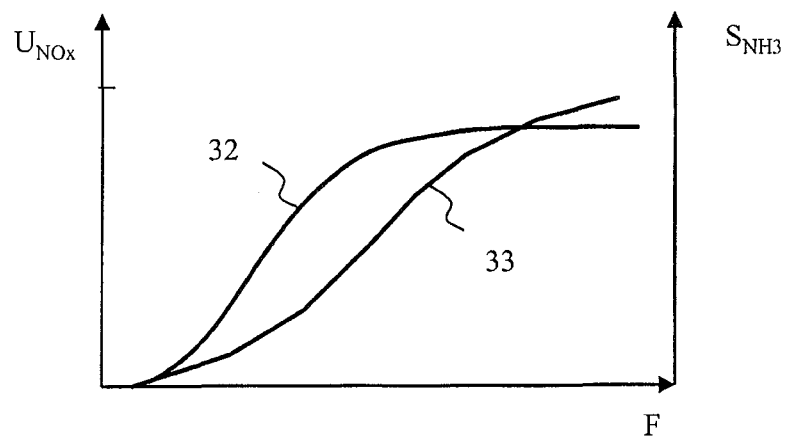
Figure 5:
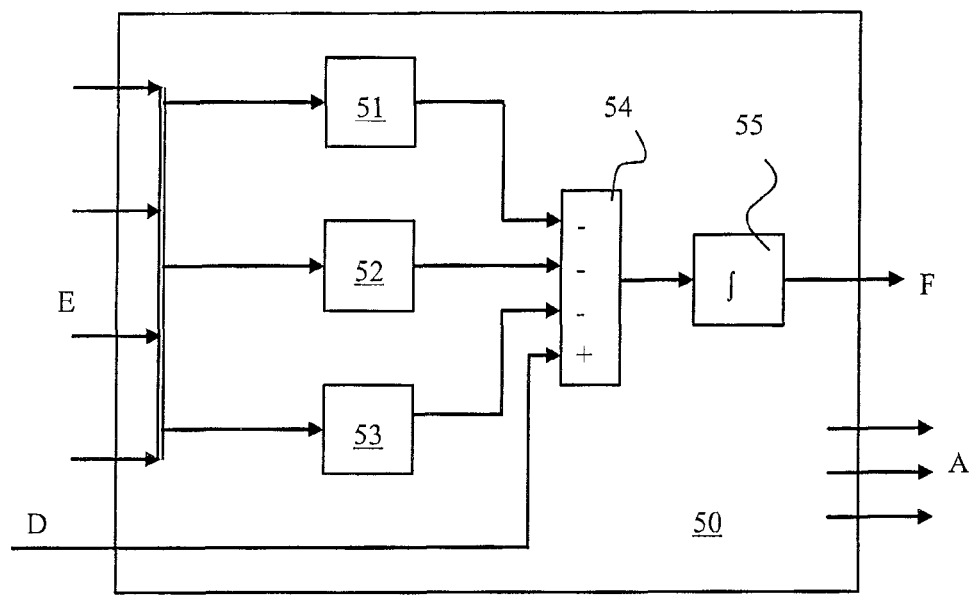
Figure 6:
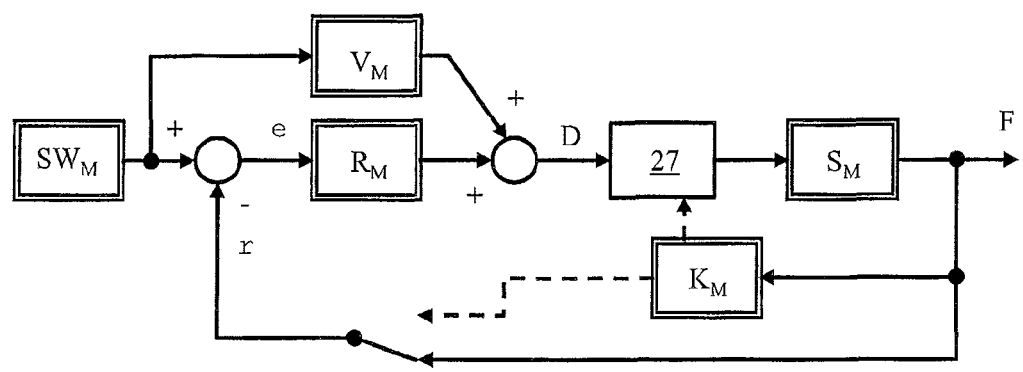
Figure 7:
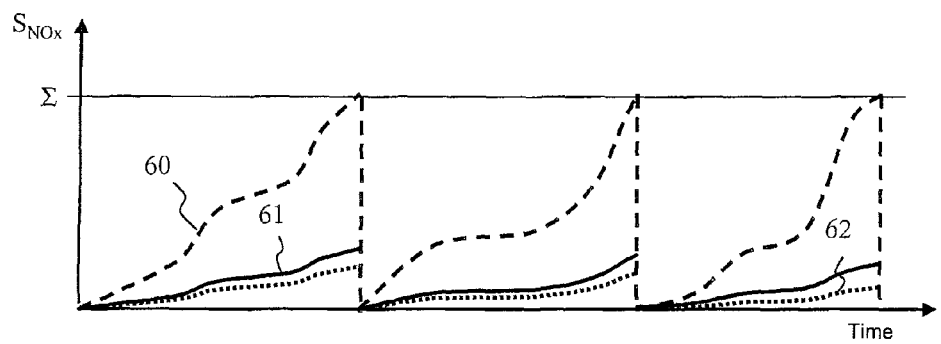
Figure 8:
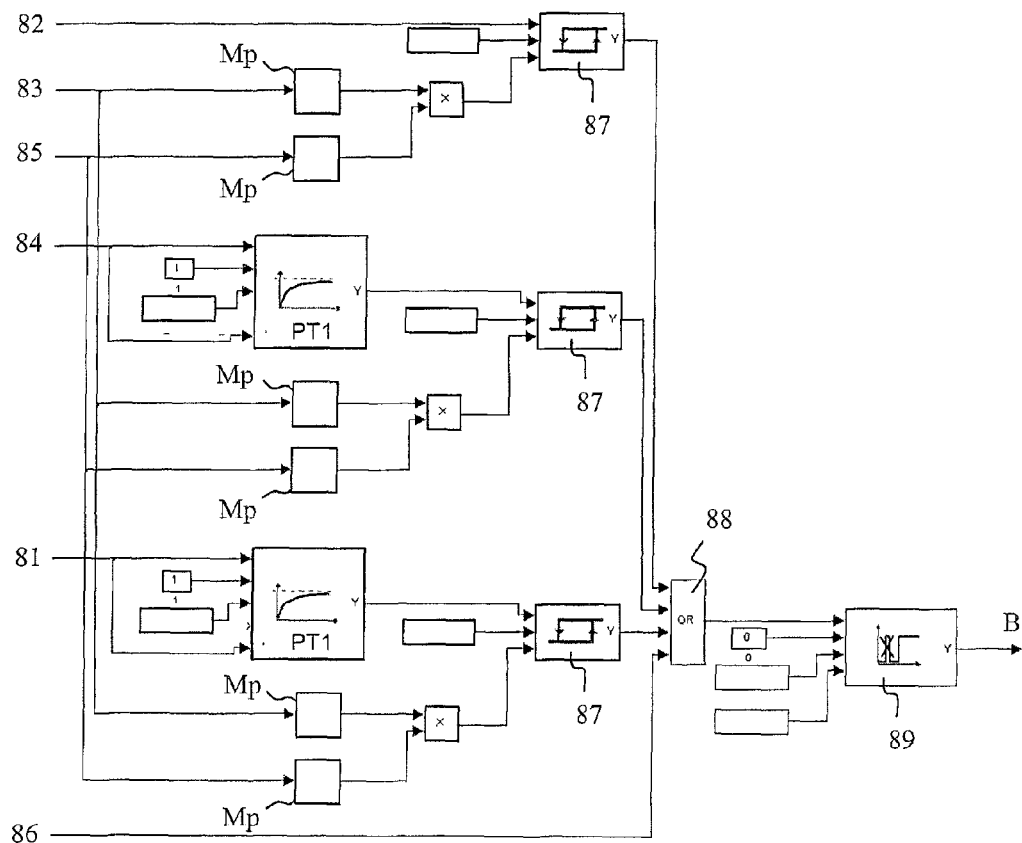
Figure 9:
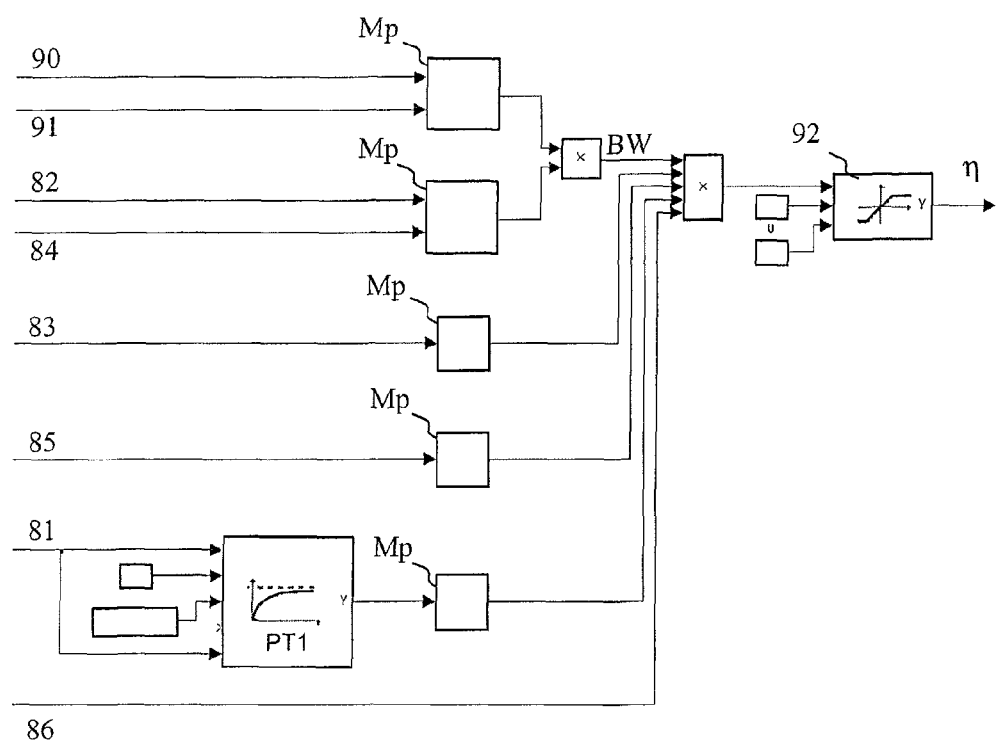

It shows thereby:

FIG. 1 is a schematic block diagram of a motor vehicle internal combustion engine with a connected exhaust gas cleaning system, FIG. 2 is a diagram for the clarification of the $NH_3$ storage capacity of an SCR catalytic converter, FIG. 3 is a diagram for the clarification of the temperature dependence of the $NH_3$ storage capacity, FIG. 4 is a diagram for the clarification of the dependence of nitrogen oxide conversion and $NH_3$ slip from the $NH_3$ filling level of an SCR catalytic converter and FIG. 5 is a schematic block diagram depiction for the clarification of a preferred procedure for determining the $NH_3$ filling level of the SCR catalytic converter of the exhaust gas cleaning system and FIG. 6 is a preferred embodiment of a structure for performing the filling level regulation, FIG. 7 is a diagram with exemplary time courses of integrated emission values which are consulted for determining an adaption characteristic value, FIG. 8 is a preferred structure for demanding a change-over between filling state regulation and efficiency control and FIG. 9 is a preferred structure of an efficiency calculating block for the definition of a target efficiency when performing an efficiency control.

DETAILED DESCRIPTION OF THE DRAWING FIGURES

FIG. 1 shows a schematic block diagram of an internal combustion 1 engine in an exemplary manner of a motor vehicle, not shown with an associated exhaust gas cleaning system. The internal combustion engine 1 is can be an air-compressing internal combustion engine, which will be referred to herein as a diesel engine. The exhaust gas ejected from the diesel engine 1 is received by an exhaust gas line 2 and successively flows through an oxidation catalytic converter 3, a particle filter 4 and a NOx reducing catalytic converter 5. The oxidation catalytic converter 3 and the particle filter 4 can also be arranged in a common housing close to each other. The particle filter 4 is preferably provided with a catalytic coating which promotes a soot combustion and/or a NO oxidation.

For heating the oxidation catalytic converter 3 or the exhaust gas, a heating device 26 can be arranged in the exhaust gas line 2 on the inlet side of the oxidation catalytic converter 3. The heating device 26 can be an electrical heating element or a reformer supplying heat or pre-combustor. A heating of the exhaust gas is particularly considered with a regeneration of the particle filter 4 by soot combustion. For the determination of whether regeneration is necessary, a differential pressure sensor is associated with the particle filter 4, which delivers a signal that can be evaluated. Furthermore, an exhaust gas turbocharger 6 is provided, whose turbine is driven by the exhaust gas flow and whose compressor feeds air taken in via an intake air line 7 to the diesel engine 1 via an air feed line 11. The exhaust gas turbocharger 6 is a so-called VTG charger with a variable adjustment of its turbine blades.

A throttle flap 12 is arranged in the air feed line 11 for the adjustment of the air amount fed to the diesel engine. An air filter 8 or an air mass meter 9 is arranged in the intake air line 7 for cleaning the intake air or for measuring the intake air amount. A charge-air cooler 10 arranged in the air feed line cools the compressed intake air. Furthermore, an exhaust gas return, not shown, that can be adjusted via an exhaust gas return valve is provided, with which a presettable amount of returned exhaust gas of the intake air can be fed.

A feed point with a dosing unit 27 is arranged upstream of the NOx reduction catalytic converter 5 for adding a reducing agent to the exhaust gas. The supply of the dosing unit 27 with the reducing agent takes place from a container (not illustrated). In the following it is assumed that the reducing agent is an aqueous urea solution which is fed to the exhaust gas via the dosing unit 27 in a dosed manner. $NH_3$ is released in the hot exhaust gas by thermolysis and or hydrolysis, which $NH_3$ acts selectively with regard to the reduction of NOx contained in the exhaust gas. The NOx reduction catalytic converter 5 is accordingly formed as a classical SCR catalytic converter based on $V_2O_5/WO_3$ or as a supported SCR catalytic converter coated with zeolite. The method according to the invention can, however, also be used advantageously for dosing other reducing agents in a free or bound form. Particularly when using aqueous urea solution as reducing agent, a mixing unit (not illustrated) can be arranged in the exhaust gas line between the dosing unit 27 and the $NO_X$ reduction catalytic converter 5, with which mixing unit reducing agent which has preferably already been sprayed by the dosing unit into the exhaust gas in a finely distributed manner is mixed with exhaust gas to a mixture that is as homogeneous as possible. A droplet evaporation and the release of $NH_3$ can thereby be promoted.

For controlling the operation of the exhaust gas cleaning system and of the diesel engine 1, a control unit (not illustrated) obtains information regarding operating state variables of the diesel engine 1 and of the exhaust gas cleaning system. Information regarding engine operating variables can, for example, relate to an emitted torque or a speed. The control unit can include a computing unit and a storage unit and an input-output unit. The control unit is capable to carry out complex signal processing procedures and to sense the operation of the diesel engine 1 and of the exhaust gas cleaning system and to control or regulate it. Characteristic fields necessary for this are deposited in the storage device, wherein an adaptive adaptation of the characteristic fields can also be provided. The characteristic fields mainly relate to the important state variables of the exhaust gas, such as mass flow, raw emission, temperature in dependence on the operating state variables of the diesel engine such as load, speed, air ratio number etc. Furthermore, characteristic fields for the important state variables of the oxidation catalytic converter 3, of the particle filter 4 and of the SCR catalytic converter 5 are provided. Regarding the SCR catalytic converter 5, these characteristic fields relate to the NOx conversion or the efficiency with regard to the nitrogen oxide conversion and the $NH_3$ storage capacity in dependence on influence variables decisive for this.

The sensing of operating states of the diesel engine 1 and of the exhaust gas cleaning system and the associated units can take place at least partially using suitable sensors. For example, FIG. 1 illustrates pressure sensors 13 and 15 for a pressure in front of the compressor and a pressure in front of the turbine of the turbocharger and temperature sensors 14, 16, 18, 19, 21, 23 and 24 for respectively a temperature after the charge-air cooler 10, in front of the turbine, in front of the oxidation catalytic converter 3, in front and behind the particle filter 4 and in front of and behind the SCR catalytic converter 5. Further sensors, particularly for sensing exhaust gas components, can also be provided. A lambda sensor 17 and sensors 20 and 25 are provided for the nitrogen oxide and/or $NH_3$ content in the exhaust gas. The signals of the sensors are processed by the control unit, so that the essential state variables are always present and the operating point of the diesel engine can be changed in such a manner, if necessary, to enable an optimal or desired operation of the exhaust gas cleaning system.

In the following, different characteristic variables of a typical SCR catalytic converter 5 used in the exhaust gas cleaning system of the diesel engine 1 are explained with regard to FIG. 4. FIG. 2 illustrates a diagram for explaining the $NH_3$ filling capacity.

The diagram of FIG. 2 represents a typical temporal course $c_{NH3}(t)$ of $NH_3$ concentrations $c_{NH3}$ with an application of the SCR catalytic converter 5 with $NH_3$. It is assumed that an SCR catalytic converter 5 free from stored $NH_3$ is applied with an exhaust gas input flow of a presettable and temporally constant variable and an $NH_3$ input concentration under isothermal conditions from the time t1, which is given by the trace 28. In correspondence with its $NH_3$ storage capacity, the SCR catalytic converter 5 receives $NH_3$ in a temporally decreasing measure in the period between t1 and t2. Corresponding to this, the $NH_3$ concentration in the exhaust gas flow leaving the SCR catalytic converter 5 remains behind the input concentration which is reproduced by the trace 29. The SCR catalytic converter is saturated at the time t2, this is why it cannot store any further $NH_3$, and the trace 29 opens into the trace 28. The $NH_3$ filling level has then reached its maximum value. The $NH_3$ amount stored by the SCR catalytic converter 5, which represents the $NH_3$ filling capacity or $NH_3$ storage ability under the corresponding conditions, is represented by the magnitude of the surface 30 between the two traces 28, 29.

The $NH_3$ filling capacity is predominantly dependent on the temperature, as is depicted by the diagram shown in FIG. 3. The trace 31 represents a typical course of the temperature-dependent $NH_3$ filling capacity $Sp_{NH3}$ (T). The $NH_3$ filling capacity $Sp_{NH3}$ (T), as can be seen in the diagram of FIG. 3, can be comparatively large with low temperatures T and decreases at high temperatures T, about 300° C. In addition, a dependence on the gas flow rate exists, which is not shown in detail.

The $NH_3$ filling level of the SCR catalytic converter 5 can be given absolutely as a stored $NH_3$ amount or as a fraction of the $NH_3$ amount that can maximally be stored under the respective conditions, that is, the $NH_3$ filling capacity $Sp_{NH3}$.

An important aspect in connection with the properties of the SCR catalytic converter 5 relates to the dependence of the NOx conversion from the $NH_3$ filling level. In FIG. 4, this dependence is shown by the trace 32. Compared to this, the dependence of the $NH_3$ slip $S_{NH3}$ on the $NH_3$ filling level is reproduced by the trace 33. The NOx conversion $U_{NOx}(F)$ thereby increases continuously with an incline becoming flatter up to a maximum value with an increasing $NH_3$ filling level F, which maximum value is essentially determined by the gas flow rate and by the temperature. This means that, from a certain value for the $NH_3$ filling level F, the NOx conversion $U_{NOX}$ cannot be increased further by a further storing of $NH_3$ in the catalytic converter. Rather, the $NH_3$ slip $S_{NH3}$ increases, as represented by the trace 33. With the adjustment of an optimal value for the $NH_3$ filling level F for the respective conditions, the consideration of these facts is important.

The dependencies shown schematically in FIGS. 2 to 4 are conveniently determined in advance for the used SCR catalytic converter 5 and are deposited as characteristic lines or characteristic fields. The control unit can access these, so that the state of the SCR catalytic converter 5 can be determined for comprising each operating state.

The present invention fixes the dosing rate for the urea solution in such a manner that an NOx conversion that is as high as possible, but at least corresponding to the requirements is enabled through the SCR catalytic converter 5. In dependence on presettable for certain operating variables particularly of the exhaust gas cleaning system, either a model-based filling level regulation of the $NH_3$ filling level of the SCR catalytic converter 5 or a model-based efficiency control of its efficiency is carried out with regard to the NOx conversion. A computer model stored as a program in the control unit is provided for realizing the model-based filling level regulation or the efficiency control. Various components of the computer model are described below.

One component of the computer model is a filling level calculation block 50, which is schematically shown in FIG. 5, for determining the $NH_3$ filling level of the SCR catalytic converter 5. Different input variables E are fed to the calculation block 50, which variables relate to exhaust gas state variables such as the exhaust gas temperature, exhaust gas mass flow and the NOx content of the exhaust gas flowing into the SCR catalytic converter 5. The latter can be determined in a measurement-technical manner or using deposited engine operating characteristic fields. The input variables E can possibly comprise further variables.

The filling level calculation block 50 can access characteristic field sets designated in an exemplary manner with 51, 52, 53 in FIG. 5, particularly regarding a $NH_3$ loss or usage of $NH_3$ stored in the SCR catalytic converter 5 and or fed thereto. These characteristic field sets 51, 52, 53 relate to, for example, the NOx conversion $U_{NOx}$, a direct conversion with oxygen and a desorption rate. A consideration of reducing agent losses by wall deposition in the exhaust gas line 2, incomplete conditioning and the like can be provided. The decisive rates are thereby determined in correspondence to the present input variables E. The values regarding the $NH_3$ loss are fed together with a model dosing rate D to a summation section 54, which sums up the respective variables with the correct prefix. A balancing for the variables is enabled in this manner, which essentially determines the $NH_3$ amount stored in the SCR catalytic converter. The sum value determined by the summation section is fed to an integration section 55, whose output magnitude is a $NH_3$ filling level value F, which represents the current $NH_3$ filling level of the SCR catalytic converter 5. In addition, further output data are determined from the present data. These are, for example, modeled values for the NOx content of the exhaust gas flowing from the SCR catalytic converter 5 and the $NH_3$ slip $S_{NH3}$.

The computer model comprises an efficiency calculation block as a further calculation block, which determines a target efficiency η for an NOx-conversion $U_{NOx}$ with $NH_3$ stored in the SCR catalytic converter 5 and or fed thereto depending on one or several of the input variables E and/or outlet variables A. The efficiency calculation block considers an influence of a passivation of the SCR catalytic converter 5 that is possibly present. Such a passivation can particularly be caused by carbohydrates (HC) fed through the SCR catalytic converter 5 and adsorbed on catalytically active centers. For considering a passivation by adsorbed hydrocarbons, an engine characteristic field regarding a HC emission of the diesel engine 1, a characteristic field regarding a HC conversion of the oxidation catalytic converter 3 and/or particle filters 4 and HC adsorption and desorption characteristic lines of the SCR catalytic converter are preferably reverted to. A preferred embodiment of the efficiency calculation block is discussed in more detail below.

As already discussed, either a model-based filling level regulation or an efficiency control is carried out by the computer model. In the following, a preferred conversion of the model-based filling level regulation for achieving the target filling level of ammonia stored in the SCR catalytic converter (5) is first discussed with regard to FIG. 6.

FIG. 6 shows a preferred regulator structure as a schematic block diagram, which is emulated by the computer model. Functional blocks represented by the computer model are characterized by a double framing and with a subscript "M".

Particularly, a target value transducer $SW_M$, a pre-control block $V_M$, a regulator $R_M$, a regulation path $S_M$ and a correction block $K_M$ are modeled or emulated by the computer model. The regulation path $S_M$ is essentially represented by the SCR catalytic converter 5, wherein further influential variables acting on the $NH_3$ filling level of the SCR catalytic converter 5 can be considered in the computer model, as has already been explained above with the description of the filling level calculation block 50.

From the target value transducer $SW_M$, a target value for the $NH_3$ filling level (target filling level) of the SCR catalytic converter 5 is generated as derived from measured operating variables of the exhaust gas cleaning system and of the diesel engine or which are taken from characteristic fields, with which a presettable NOx content to be aimed for would result in a calculated manner in the exhaust gas on the output side of the SCR catalytic converter 5 or a presettable efficiency of the SCR catalytic converter 5. The target filling level serves as a reference variable of the control cycle and is passed to the pre-control block $V_M$, and a control deviation e is formed by subtraction of a return value r, which control deviation is fed to the regulator $R_M$. A pre-control value provided by the pre-control block and an output of the regulator $R_M$ are combined to the model dosing rate, which is fed to the dosing unit 27 as an auxiliary actuating variable and causes the dosing unit to perform a pulse-width modulated synchronized emission of urea solution into the exhaust gas. The corresponding dosing rate represent an actuating variable y of the control cycle, which acts on the regulation path $S_M$ and leads to a modeled $NH_3$ filling level value F as regulation variable.

In one aspect, the pre-control value for the dosing rate is calculated with the model-based filling level regulation from the reducing agent amount necessary for the reduction of the current NOx raw emission of the diesel engine 1, which is multiplied with a factor which considers the modeled efficiency or NOx conversion of the SCR catalytic converter corresponding to the current conditions. In this manner, an overdosing can be avoided with a high degree of safety.

Even though a high NOx conversion $U_{NOx}$ of the SCR catalytic converter 5 can be achieved in a largely reliable manner with the model-based filling level regulation emulated by the computer model corresponding to the description above, a correcting intervention is possibly provided over the correction block $K_M$. The intervention of the correction block can, as indicated by the dashed action arrows, act in a correcting manner on the model dosing rate on the one hand and on the other hand in a correcting manner on the $NH_3$ filling level value F, which will be discussed in more detail in the below.

The correction by adaption provided according to the invention is based on a measurement-technical control of pure emission values of the exhaust gas present behind the SCR catalytic converter. If, for example, undesired deviations from the modeled result for the toxic substances NOx or $NH_3$ results, an adaptive correction of the model dosing rate D and/or the $NH_3$ filling level is carried out. A measurement-technical determination of the $NH_3$ emission and of the NOx emission on the output side of the SCR catalytic converter 5 can thereby be provided with separate exhaust gas sensors 25, which are only sensitive to $NH_3$ or NOx.

If a value for an $NH_3$ emission determined in a measurement-technical manner on the output side of the SCR catalytic converter 5 exceeds a corresponding estimated value determined by the computer model be a presettable amount, the computer model calculated a model dosing rate D that is too high. In this case, the model dosing rate D can be corrected by multiplication with a long term adaption factor in such a manner that a target dosing rate reduced with regard to the model dosing rate D is obtained, with which the dosing unit 27 is accessed for outputting the reducing agent. If, however, a value for a NOx emission determined in a measurement-technical manner exceeds a corresponding estimated value determined by the computer model by a presettable amount, the computer model calculated a model dosing rate D that is too low. In this case, the model dosing rate D can be corrected in such a manner by multiplication with the long term adaption factor that a target dosing rate is obtained that is increased with regard to the model dosing rate D, with which the dosing unit 27 is accessed for outputting the reducing agent. Accordingly, a necessary correction is achieved by a multiplication of the model dosing rate D with the long term adaption factor from the outset and to reduce or to increase the long term adaption factor by a presettable step width. With a first operation of the exhaust gas cleaning system, the long term adaption factor is preferably preallocated with the value 1.0.

According to the invention, when a value determined in a measurement-technical manner for a NOx emission falls below a corresponding estimated value determined by the computer model by a presettable amount, a correction of the $NH_3$ filling level value F determined by the computer model is carried out on the output side of the SCR catalytic converter 5. A multiplication of the $NH_3$ filling level value F with a short term adaption factor is provided in such a manner that an assumed $NH_3$ actual filling level increased compared to the $NH_3$ filling level F is obtained, with which the further calculations of the computer model are carried out. The measure of the increase or the amount of the short term adaption factor is thereby preferably fixed in dependence on the measure of the determined deviation in a presettable manner.

In order to determine deviations of the emission values determined in a measurement-technical manner by the values determined by the computer model, integrations are continuously performed over successive integration cycles of a presettable length and to compare the obtained summed values. A quantitative adaption characteristic value can be determined from the summed values, which is cyclically evaluated for the fulfilling of a presettable short term and/or long term adaption criterion. This procedure is explained in more detail in the following for the case that an exhaust gas sensor 25 is used which is sensitive with regard to NOx and also simultaneously with regard to $NH_3$. By the use of an exhaust gas sensor 25 formed in such a manner, a sensor can be saved, whereby however particular attention has to be paid to the right interpretation of the sensor signal. Using the preferred procedure explained in the following, wrong interpretations are avoided.

For explaining the preferred procedure for determining the adaption characteristic value decisive for carrying out a long term or short term adaption, we first refer to FIG. 7. Therein, courses $S_{NOx}$ of integrated NOx emission values obtained in three successive integration cycles are shown in an exemplary manner. A trace characterized with the parameter 60 reproduces the integrated course of the NOx amount flowing into the SCR catalytic converter 5. The trace 61 correspondingly corresponds to an to an outflowing NOx amount determined with an exhaust gas sensor 25 which is sensitive with regard to $NH_3$ and NOx in a measurement-technical manner. The trace 62 reflects the corresponding outflowing NOx amount calculated or estimated by the computer model.

The length of a respective integration cycle can be determined by a presettable fixed time span. The length of an integration cycle is presently, however, connected to the achieving of a presettable summing value E for the integrated NOx amount flowing into the SCR catalytic converter 5 according to trace 60, called NOx raw emission value $NOx_{in}$ in the following. Depending on the type of the diesel engine 1, the summing value Σ is given in a preferred region of 0.1 g NOx to 1.0 g NOx, calculated as NO. The integral NOx emission value for the measured NOx on the output side of the SCR catalytic converter 5 (trace 61) is called NOx pure emission measuring value $NOx_{outmes}$ in the following. Analogously, the integral value (trace 62) calculated by the computer model at the integration cycle end is called estimated NOx raw emission value $NOx_{outcalc}$.

The adaption characteristic value decisive for carrying out a long term and/or short term adaption is now preferably determined by the relation $$K=(NOx_{outmes}-NOx_{outcalc}):NOx_{in}$$

For a further evaluation an average value for the adaption characteristic value K for several successive integration cycles is determined, which achieves an improved safety statistic.

For evaluating the adaption characteristic value K with regard to the presence of the long term or short term adaption criterion decisive for a long term or short term adaption to be carried out, it is checked if the adaption characteristic value K lies above a presettable upper threshold or below a presettable lower threshold. If the adaption characteristic lies within a region between the upper and the lower threshold, it is assumed that the computer model operates in a satisfactory manner, and the cyclic determination of adaption characteristic values is continued without carrying out an adaption.

If the adaption characteristic value K lies below the lower threshold of for example −0.4, the raw emission measuring value $NOx_{outmes}$ is smaller by an impermissible amount than was to be expected due to the modeling. It is assumed in this case that the actual $NH_3$ filling level of the SCR catalytic converter 5 has reached a critical height, or exceeds the $NH_3$ filling level value F determined by the computer model in an impermissible manner and the short term criterion is viewed as to be fulfilled. In this case, a short term adaption is carried out in that the $NH_3$ filling level value F determined by the computer model is increased by multiplication with a short term adaption factor >1.0. The magnitude of the short term adaption factor is thereby preferably determined from a characteristic field of a characteristic line for a dependence on NOx conversion and $NH_3$ filling level analogously to the diagram shown in FIG. 4 in such a manner that the $NH_3$ filling level value F corrected to the assumed actual filling level goes with the NOx pure emission measuring value $NOx_{outmes}$. After expiration of a presettable blocking time, in which swinging processes can abate, the further cyclic determination or evaluation of adaption characteristic values K can be performed. With the further calculation, the computer model for calculating the model dosing rate D assumes an actual corrected higher filling level which is assumed corresponding to the correction compared to the initially determined $NH_3$ filling level value F.

If more than a presettable number of short term adaptations become necessary during a presettable time span of for example 5 min to 60 min, a continuous overdosing is assumed and a long term adaption preferably takes place in such a manner that the model dosing rate D determined by the computer model is multiplied with a long term adaption factor reduced by a presettable step width.

If the result of the evaluation of the adaption characteristic value K lies above the upper threshold of about for example 0.1, a pure emission increased in an impermissible manner compared to the calculations of the computer model was measured by the exhaust gas sensor 25. The long term adaption criterion is fulfilled and a change of the long term adaption factor is provided. In the case of an exhaust gas sensor sensitive with regard to NOx and $NH_3$, a decision procedure is first provided in direct succession to the determination of the adaption characteristic value lying above. It is decided in this if the signal delivered by the exhaust gas sensor 25 is to be viewed as being based on NOx or on $NH_3$. The decision procedure is explained in more detail in the following.

As a first step of the decision procedure, the dosing unit 27 for outputting a dosing pulse is accessed with a dosing rate of the reducing agent increased over the normal measure in the short term and pulse-like. The dosing pulse can be formed in the type of a DT1 member. The amplitude of the DT1 dosing pulse can be chosen according to a $NH_3$ dosing rate in the region of 5 mg $NH_3$/s to 20 mg $NH_3$/s. An abatement time of the DT1 dosing pulse of 5 s to 60 s can be chosen as the time constant. The start of the dosing pulse serves as the trigger for the start of an integration cycle for determining the NOx raw emission value $NOx_{in}$ of the NOx pure emission measuring value $NOx_{outmes}$ and of the NOx pure emission estimated value $NOx_{outcalc}$, with subsequent calculation of the adaption characteristic value K corresponding to the previous explanations. It is preferred thereby to reduce the sum value Σ determining the duration of the integration cycle with regard to the normal adjustment, so that the adaption characteristic value is available in a faster manner.

If, due to the short term and pulse-like increased dosing rate, an adaption characteristic value K reduced compared to the previous value below the upper threshold, is determined, an underdosing is present in front of the decision procedure, and the measuring value or measuring value or the Nox pure emission measuring value $NOx_{outmes}$ is interpreted as being based on $NH_3$. As a reaction to this decision, the long term adaption factor, with which the model dosing rate D is multiplied, is reduced by a presettable step width and the dosing unit 27 is accessed for the dispensing of the model dosing rate corrected corresponding to the target dosing rate. Subsequently, the continuous determination of adaption characteristic values K is taken up again, preferably after a presettable blocking time.

If a further increased adaption characteristic value K lying above the upper threshold is now determined subsequently to the dosing rate increased in the short term and like a pulse, an overdosing is present in front of the decision procedure and the measuring value 25 delivered measuring value or the NOx pure emission measuring value $NOx_{outmes}$ is interpreted as being based on $NH_3$. As a reaction to this decision, the long term adaption factor, with which the model dosing rate D is multiplied, is reduced by a presettable step width and the dosing unit 27 is accessed for the dispensing of the model dosing rate corrected corresponding to the target dosing rate. Subsequently, the continuous determination of adaption characteristic values is taken up again, preferably after a presettable blocking time. It is additionally advantageously provided, particularly even before the reduction of the long term adaption factor, to reduce an exhaust gas return rate for a short presettable time span or to set it to zero by closing the exhaust gas return valve. In this manner, the NOx raw emission of the diesel engine 1 is increased above the normal value in the short term, Thereby, $NH_3$ fed additionally to the SCR catalytic converter and an increased $NH_3$ filling level are quickly degraded by the dosing pulse and a $NH_3$ slip that is undesirably high is prevented.

In some operating regions, undesired inaccuracies can occur with a model-based $NH_3$ filling level regulation that is applied to the $NH_3$ filling level. For solving this problem, it is provided under presettable conditions according to the invention to switch over from the model-based filling level regulation to an efficiency control for achieving a presettable target efficiency η of the SCR catalytic converter 5 for the NOx conversion. It is provided inversely to switch back to the model-based filling level regulation when the conditions of the efficiency control are omitted. In the following, it is explained in more detail with regard to FIG. 8, under which conditions a switch-over is requested or initiated in a preferred manner. Thereby, only the combinations decisive for an understanding are discussed and an explanation of further details is omitted for simplicity.

FIG. 8 shows a decision and evaluation procedure for determining a switch-over criterion decision for the switch-over between model-based filling level regulation and model-based efficiency control. Using the computer model, values 81 are read in for a current mass flow of nitrogen oxide (NOx raw emission mass flow) flowing into the SCR catalytic converter 5, 82 for a current temperature of the exhaust gas or of the SCR catalytic converter 5, 84 for the current mass flow of exhaust gas flowing into the SCR catalytic converter 5 and 86 for further operating variables, as for example a current filling capacity determined by the computer model for a maximum ammonia amount that can currently be stored in the SCR catalytic converter 5. The values 81, 84 for the NOx raw emission mass flow and the exhaust gas mass flow are thereby subjected to a signal filtering using a PT1 member PT1 with a time constant of typically 10 s to 200 s. A smoothing is achieved and an influence of signal peaks applied in the short term is minimized. Values 83, 85, which characterize an ageing and a passivation of the SCR catalytic converter 5, are further read in and from these are generated correction factors for the temperature, the filtered exhaust gas mass flow and the filtered NOx raw emission mass flow using characteristic lines Mp. Using this correction, a consideration of decisive properties of the SCR catalytic converter 5 and thus of the regulation path $S_M$ is enabled with the determination of the switch-over criterion decisive for a switch-over according to FIG. 6. The corrected and possibly filtered values 81, 82, 84 for the NOx raw emission mass flow, the exhaust gas mass flow and the temperature are subjected to the threshold analysis 87. A binary signal is set to true when exceeding a respective presettable upper hysteresis threshold or set to false when undercutting a lower hysteresis threshold. Even though this is not shown, a processing of the further operating variables 86 can be provided in an analogous manner with regard to the signal filtering, correction and threshold value analysis. Typical values for the upper hysteresis threshold are about 400° C. for the temperature, about 380 kg/h for the exhaust gas mass flow and 35 mg/s for the NOx raw emission mass flow.

Using an OR interconnection 88, it is determined if at least one upper threshold value is exceeded, and in this case a binary requirement signal B for requiring a switch-over from the filling level regulation to the efficiency control is set to true via a time debouncing 89. If all lower threshold values are undercut, the requirement signal is set to false. The time debouncing ensures that the output of the OR interconnection 88 has to have a presettable time span of five seconds in order to be able to effect a change of the requirement signal B and thus a switch-over. The decision safety is improved in this manner and switch-overs that are not compellingly necessary are avoided. The output of the OR interconnection 88 thus represents the switch-over criterion that is decisive for the switch-over between the model-based filling level regulation and the model-based efficiency control.

With an active efficiency control, the regulation is terminated by interrupting the regulation cycle according to FIG. 6 and a target efficiency η for a nitrogen oxide conversion $U_{NOX}$ with ammonia stored in the SCR catalytic converter 5 and/or fed to the SCR catalytic converter is presettable by the target value transducer $SW_M$.

In the following, a preferred arrangement of an efficiency calculation block of the computer model for fixing a value for the target efficiency η is explained with reference to a structural diagram shown in FIG. 9 in which elements with the same reference numbers as those in FIG. 8 correspond to each other.

From the computer model are read in values of 90 and 91 for the speed and the fuel injection amount of the diesel engine 1 in addition to values 82 for the current temperature of the exhaust gas or of the SCR catalytic converter 5 and values 84 for the current exhaust gas mass flow and from further associated characteristic fields Mp a base efficiency BW is determined, which corresponds at least approximately to a current possible maximum efficiency for the NOx conversion $U_{NOX}$ of the SCR catalytic converter. Further, values 81, 83, 85 for the NOx raw emission mass flow, the ageing and passivation of the SCR catalytic converter 5 and therefrom using characteristic lines correction factors are generated, wherein a PT1 signal filtering of the NOx raw emission mass flow is performed. By the multiplicative combination with the base efficiency degree BW and while interconnecting a limiter 92, a target efficiency η that is reduced compared to the base efficiency corresponding to the corrections carried out. The target efficiency η is typically 70% to 95% of the maximum possible efficiency.

With an active efficiency control, the target value transducer $SW_M$ (see FIG. 6) passes the target efficiency η to the pre-control block $V_M$ and to the regulator $R_M$, which is now operating as the control unit. The pre-control block $V_M$ determines a corresponding pre-control value for the model dosing rate D to be issued by the dosing unit 27 while considering the stoichiometry of the chemical reduction reaction of NOx with $NH_3$. The regulator or the control unit $R_M$ is operated in such a manner that it can reduce the pre-control value if need be. An increase of the typically reduced pre-control value compared to the operation with the filling level regulation is thereby prevented. In a preferred embodiment, the pre-control value for the dosing rate with the model-based efficiency control is calculated from the reducing agent amount necessary for the reduction of the current NOx raw emission of the diesel engine 1, which is multiplied with a target efficiency η. The control of the dosing unit 27 can occur as a pure pre-control.

Using an active efficiency control, a correction of the model dosing rate D to a target dosing rate corrected by a long term adaption factor. When using an exhaust gas sensor 25 that is sensitive with regard to NOx and also simultaneously with regard to $NH_3$, the long term adaption is facilitated in an advantageous manner in that the operation of the SCR catalytic converter 5 takes place while safely avoiding $NH_3$ slip due to the target efficiency η reduction with regard to the maximum possible efficiency and the signal of the exhaust gas sensor can thus be interpreted as based on NOx. With the long term adaption also provided with the efficiency control, the above-described decision procedure with regard to the interpretation of the signal of the exhaust gas sensor 25 can be foregone, wherein one can otherwise proceed analogously to the above procedure explained for the case of the filling level regulation.

If the evaluation of the adaption characteristic value K determined analogously to the filling level regulation results with an active efficiency control that this is above the upper threshold value of for example 0.1, the long term adaption criterion is seen to be fulfilled, as an impermissibly increased NOx pure emission measuring value $NOx_{outmes}$ compared to the calculations of the computer module was measured by the exhaust gas sensor 25, whereby a target dosing rate which is correspondingly adjusted too low can be concluded. An increase of the long term adaption factor K is performed as a reaction to this. The increase of the long term adaption factor is thereby fixed in such a manner that, with a correspondingly corrected model dosing rate D in the backdated integration cycle, an estimated NOx pure emission value $NOx_{outcalc}$ would have resulted, which would have resulted in an adaption characteristic value K of zero or approximately zero.

Deviating from the procedure described above, it can be determined according to the relation also by a modified determination of the adaption characteristic value K according to the relation $$K = f*(NOx_{in} - NOx_{outcalc}) : (NOx_{in} - NOx_{outmes})$$

if a long term adaption is to be performed, wherein f represents a safety factor with a value of typically smaller than one, which is preferably fixed in dependence of the NOx raw emission value $NOx_{in}$. Preferably, an average value of several, for example four adaption characteristic values K are successively determined. If a presettable deviation of one is determined, the long term adaption factor is changed by a presettable step width.

Altogether, it is thus ensured with the switch-over provided according to the invention in dependence on the operating state that an optimal dosing rate is achieved for the reducing agent and thus an optimal nitrogen oxide reduction in a very wide operating region.

Regarding the switch-over procedure of filling level regulation to the efficiency control and vice versa, a gliding transfer between the respective, pre-control values typically different from each other are provided for the dosing rate. With the transfer from the efficiency control to the filling level regulation, the long term adaption factor determined with the active efficiency control is taken on preferably, wherein a weighting with a presettable weighting factor is preferably provided. Analogously, it is provided that, with the transfer from the filling level regulation to the efficiency control, the long term adaption factor effective with the active filling level regulation is taken on with a weighting. Undesired jumps of the long term adaption factor are thereby prevented with a switch-over of the operating types and an undesired drifting apart of the respectively effective long term adaption factors The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an exhaust gas treatment system, comprising an SCR catalytic converter for cleaning an exhaust gas of a motor vehicle internal combustion engine, the method comprising:
   determining, using a computer model, an ammonia filling level value for a filling state of ammonia stored in the SCR catalytic converter;
   adding, an ammonia-containing reducing agent to the exhaust gas at a first adjustable dosing rate to reach a target filling level of ammonia stored in the SCR catalytic converter, wherein the first adjustable dosing rate is a model dosing rate at which the target filling level of the ammonia stored in the SCR catalytic converter is specified by the computer model;
   feeding an exhaust gas enriched with the added ammonia to the SCR catalytic converter;
   switching to a second adjustable dosing rate in dependence on a certain preset value and adding the ammonia-containing reducing agent to the exhaust gas at the second adjustable dosing rate in dependence on a certain preset value to reach a target efficiency of a specific level of nitrogen oxide conversion with (i) ammonia stored in the SCR catalytic converter or (ii) a specific amount of ammonia fed to the SCR catalytic converter, wherein the second adjustable dosing rate is a model-based efficiency control for achieving the target efficiency, wherein the certain preset value comprises one or more of
      a current filling capacity determined by the computer model for a maximum amount of ammonia that can be currently stored in the SCR catalytic converter,
      a temperature of the exhaust gas or of the SCR catalytic converter,
      a mass flow of exhaust gas flowing into the SCR catalytic converter, or
      a mass flow of nitrogen oxide flowing into the SCR catalytic converter,
   wherein a base efficiency is determined by the computer model that at least approximately corresponds to a currently possible maximum efficiency for the NOx conversion of the SCR catalytic converter and the target efficiency is a presettable fraction of the base efficiency.

2. The method according to claim 1, wherein a pre-control of the dosing rate is performed with an active filling level control.

3. The method according to claim 1, wherein the first or second dosing rate is corrected by a changeable long time adaption factor to a target dosing rate.

4. The method according to claim 1, wherein the first or second dosing rate is corrected by a changeable short term adaption to an assumed actual filling level.

5. The method according to claim 3, wherein nitrogen or ammonia emission values of the exhaust gas are continuously determined and the nitrogen oxide or the ammonia emission values are evaluated in a cyclical manner with regard to the fulfilling of a predetermined short term adaption criterion or of a long term adaption criterion.

6. The method according to claim 4, wherein nitrogen or ammonia emission values of the exhaust gas are continuously determined and the nitrogen oxide or the ammonia emission values are evaluated in a cyclical manner with regard to the fulfilling of a predetermined short term adaption criterion or of a long term adaption criterion.

7. The method according to claim 3, wherein a value for an ammonia emission on an outlet side of the SCR catalytic converter is measured by a sensor and when this value exceeds a corresponding estimated value determined by the computer model by a presettable measure, a correction of the model dosing rate reducing the current dosing rate is performed by the long term adaption factor.

8. The method according to claim 4, wherein a value for an ammonia emission on an outlet side of the SCR catalytic converter is measured by a sensor and when this value exceeds a corresponding estimated value determined by the computer model by a presettable measure, a correction of the model dosing rate reducing the current dosing rate is performed by the long term adaption factor.

9. The method according to claim 5, wherein a value for an ammonia emission on an outlet side of the SCR catalytic converter is measured by a sensor and when this value exceeds a corresponding estimated value determined by the computer model by a presettable measure, a correction of the model dosing rate reducing the current dosing rate is performed by the long term adaption factor.

10. The method according to claim 9, wherein the sensor is an exhaust gas sensor arranged on outlet side of the SCR catalytic converter and is simultaneously sensitive with regard to ammonia and nitrogen oxide.

* * * * *